US009651792B2

(12) United States Patent
Hayashi et al.

(10) Patent No.: US 9,651,792 B2
(45) Date of Patent: May 16, 2017

(54) IMAGE DISPLAY APPARATUS

(71) Applicant: Panasonic Intellectual Property Management Co., Ltd., Osaka (JP)

(72) Inventors: Katsuhiko Hayashi, Nara (JP); Shuji Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/816,423

(22) Filed: Aug. 3, 2015

(65) Prior Publication Data

US 2015/0338670 A1 Nov. 26, 2015

Related U.S. Application Data

(63) Continuation of application No. PCT/JP2014/001217, filed on Mar. 5, 2014.

(30) Foreign Application Priority Data

Mar. 27, 2013 (JP) ................................ 2013-065896

(51) Int. Cl.
*G02F 1/1335* (2006.01)
*G02B 27/22* (2006.01)
(Continued)

(52) U.S. Cl.
CPC ......... *G02B 27/2214* (2013.01); *G02B 27/22* (2013.01); *G02F 1/1347* (2013.01); *G09F 9/00* (2013.01)

(58) Field of Classification Search
CPC .... G02F 1/29; G02F 1/133526; G02F 1/1335; G02F 1/1313; G02F 1/13471;
(Continued)

(56) References Cited

U.S. PATENT DOCUMENTS 5,648,859 A 7/1997 Hirabayashi et al.
9,229,252 B2 * 1/2016 Toko .................... G02F 1/1313
(Continued)

FOREIGN PATENT DOCUMENTS

JP 05-323261 12/1993
JP 07-92507 4/1995
(Continued)

OTHER PUBLICATIONS

International Search Report issued Jun. 3, 2014 in International (PCT) Application No. PCT/JP2014/001217.

*Primary Examiner* — Thoi Duong

(74) *Attorney, Agent, or Firm* — Wenderoth, Lind & Ponack, L.L.P.

(57) ABSTRACT

The present disclosure provides an image display apparatus having excellent light converging characteristics. The image display apparatus includes: a liquid crystal prism element including a prism array in which a plurality of prisms are arranged, a liquid crystal layer laminated on the prism array, and electrodes provided at position corresponding to the respective prisms which form the prism array; a control section configured to control a voltage to be applied to each electrode; and a position detection section configured to detect a viewing position of a user. The control section is able to apply the same or different voltages to the respective electrodes provided at the positions corresponding to the respective prisms, on the basis of a result of the detection of the viewing position by the position detection section.

3 Claims, 6 Drawing Sheets

10: IMAGE DISPLAY APPARATUS
20: BACKLIGHT
21: LIGHT SOURCE
22: REFLECTION FILM
23 LIGHT GUIDE PLATE
24: INCLINED SURFACE
30: LIGHT CONTROL FILM
31: PRISM
40: LIQUID CRYSTAL PRISM ELEMENT
41: SUBSTRATE
42: SUBSTRATE
43: PRISM
44: PRISM ARRAY
45: LIQUID CRYSTAL LAYER
48: FIRST ELECTRODE
49: SECOND ELECTRODE
50: IMAGE DISPLAY PANEL
60: CONTROL SECTION
70: POSITION DETECTION SECTION
71: CAMERA
72: VIEWING POSITION CALCULATION SECTION

(51) Int. Cl.
*G09F 9/00* (2006.01)
*G02F 1/1347* (2006.01)

(58) Field of Classification Search
CPC ............. G02F 1/1336; G02F 1/133504; G02F 1/133524; G02F 1/133603; G02F 1/133606; G02F 2203/12; G02F 2203/24; G02F 2001/133607; G03H 2001/0224; G03H 2223/18; G02B 27/2214; G02B 27/225; G02B 6/0053; G02B 5/045; G02B 5/04; H04N 13/00; F24J 2/06; F24J 2/085; F24J 2/062; G09G 3/3406; G09G 2320/0626; G09G 2300/0426
USPC ....... 349/15, 193, 57, 113, 200, 202, 33, 65, 349/62, 95; 345/87, 102, 207, 92; 348/42, 51
See application file for complete search history.

(56) References Cited

U.S. PATENT DOCUMENTS

| | | | | |
|---|---|---|---|---|
| 2008/0002247 | A1* | 1/2008 | Nagato ............. | G02B 26/0883 359/222.1 |
| 2009/0015737 | A1* | 1/2009 | Jung .................. | G02B 27/2214 349/15 |
| 2010/0157026 | A1 | 6/2010 | Reichelt | |
| 2012/0154270 | A1 | 6/2012 | Numao | |

FOREIGN PATENT DOCUMENTS

| | | |
|---|---|---|
| JP | 2010-529485 | 8/2010 |
| WO | 2011/040088 | 4/2011 |

* cited by examiner

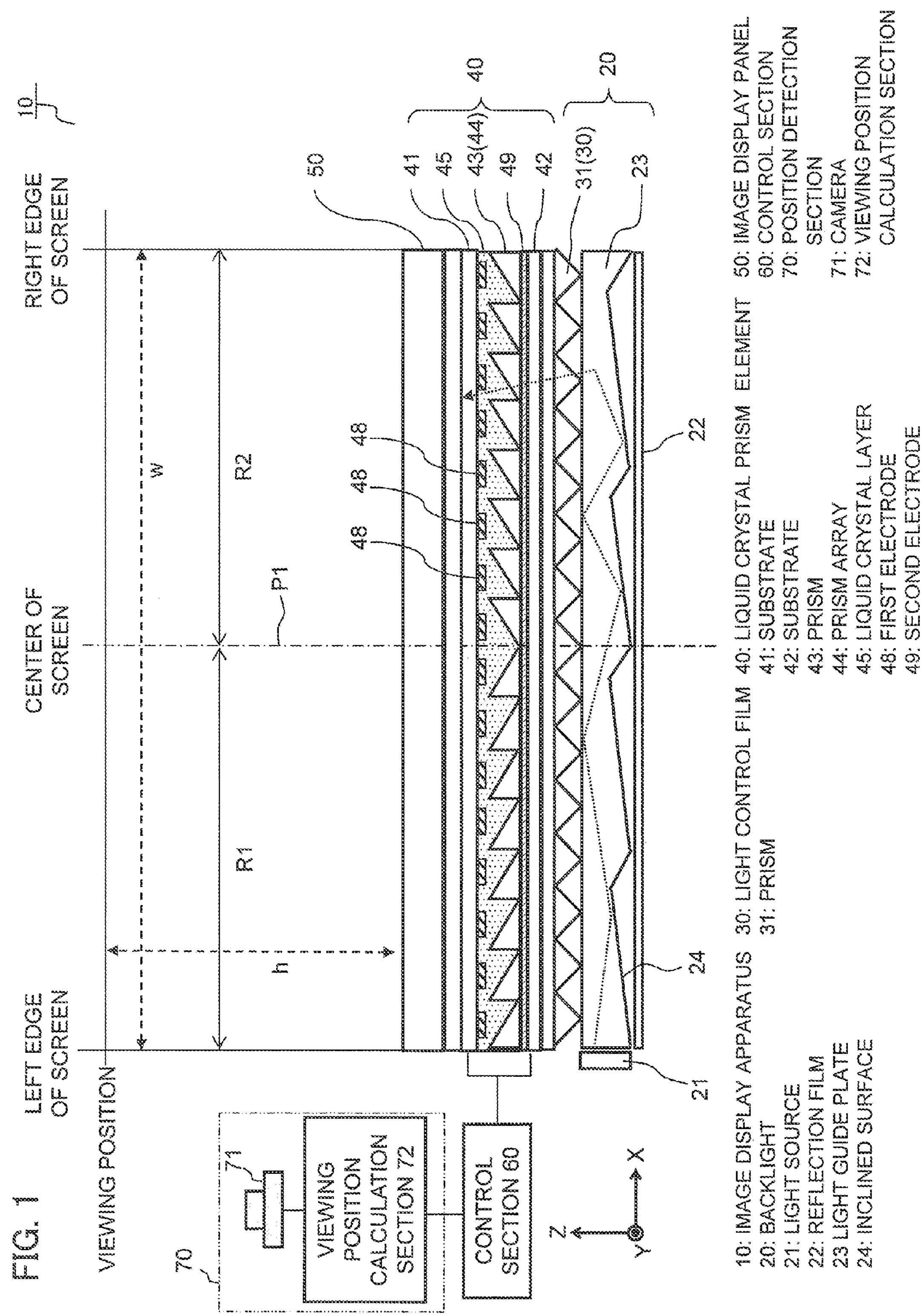

FIG. 1
VIEWING POSITION
LEFT EDGE OF SCREEN
CENTER OF SCREEN
RIGHT EDGE OF SCREEN
10
50
41
45
43(44)
49
42
40
31(30)
23
20
48
48
48
w
R2
R1
h
P1
22
24
21
70
71
VIEWING POSITION CALCULATION SECTION 72
CONTROL SECTION 60
Z
X
Y
10: IMAGE DISPLAY APPARATUS
20: BACKLIGHT
21: LIGHT SOURCE
22: REFLECTION FILM
23 LIGHT GUIDE PLATE
24: INCLINED SURFACE
30: LIGHT CONTROL FILM
31: PRISM
40: LIQUID CRYSTAL PRISM ELEMENT
41: SUBSTRATE
42: SUBSTRATE
43: PRISM
44: PRISM ARRAY
45: LIQUID CRYSTAL LAYER
48: FIRST ELECTRODE
49: SECOND ELECTRODE
50: IMAGE DISPLAY PANEL
60: CONTROL SECTION
70: POSITION DETECTION SECTION
71: CAMERA
72: VIEWING POSITION CALCULATION SECTION 10
40
20
50
45
30
23
P1
R1
R2
41
48
43(44)
49
42
21
Z
X
Y
10: IMAGE DISPLAY APPARATUS
20: BACKLIGHT
21: LIGHT SOURCE
23: LIGHT GUIDE PLATE
30: LIGHT CONTROL FILM
40: LIQUID CRYSTAL PRIMS ELEMENT
41: SUBSTRATE
42: SUBSTRATE
43: PRISM
44: PRISM ARRAY
45: LIQUID CRYSTAL LAYER
48: FIRST ELECTRODE
49: SECOND ELECTRODE
50: IMAGE DISPLAY PANEL

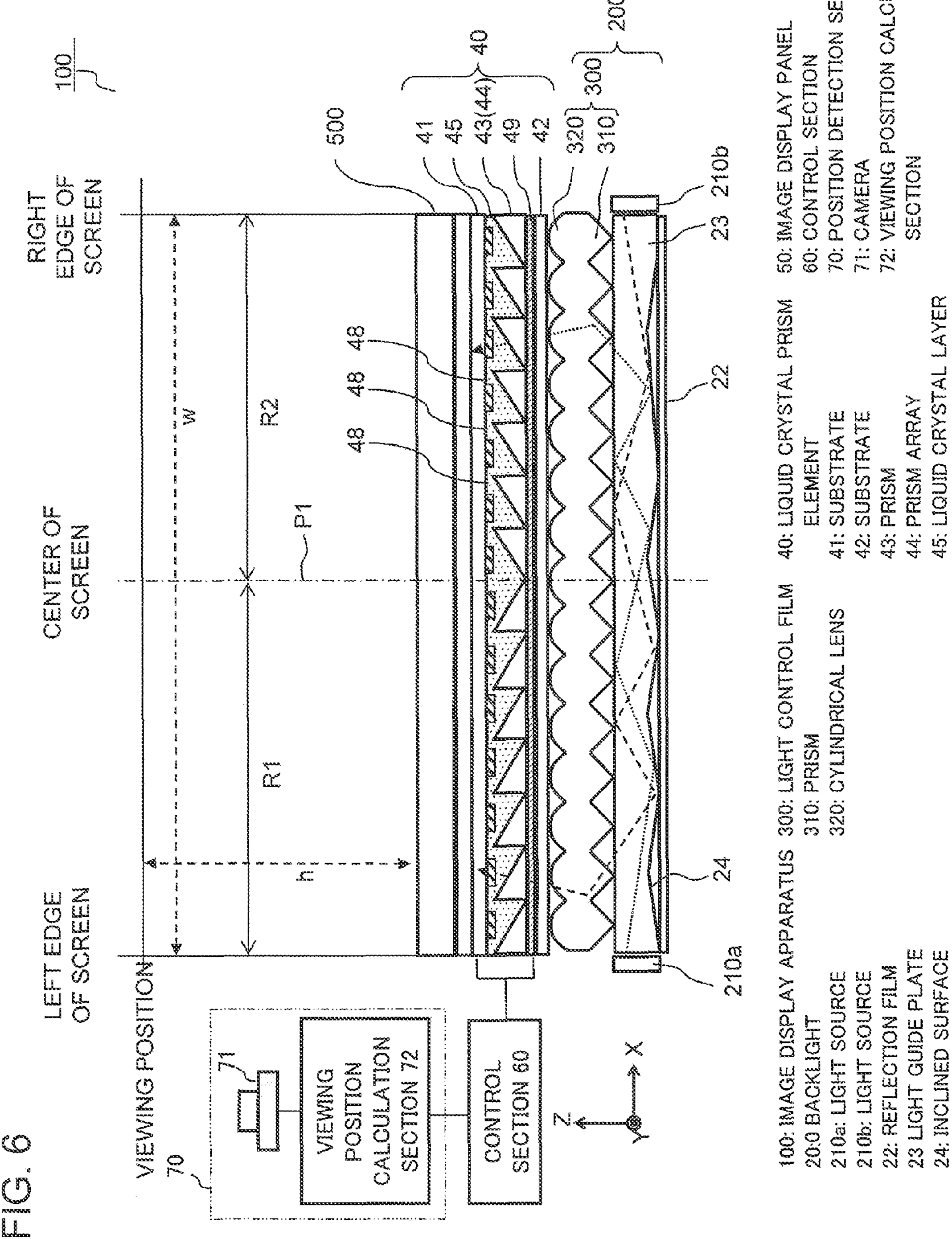
FIG. 6
VIEWING POSITION
LEFT EDGE OF SCREEN
CENTER OF SCREEN
RIGHT EDGE OF SCREEN
100
500
41
45
43(44)
49
42
40
320
310
300
200
48
48
48
W
R2
R1
h
P1
210b
23
22
24
210a
70
71
VIEWING POSITION CALCULATION SECTION 72
CONTROL SECTION 60
Z
X
Y
100: IMAGE DISPLAY APPARATUS
200: BACKLIGHT
210a: LIGHT SOURCE
210b: LIGHT SOURCE
22: REFLECTION FILM
23: LIGHT GUIDE PLATE
24: INCLINED SURFACE
300: LIGHT CONTROL FILM
310: PRISM
320: CYLINDRICAL LENS
40: LIQUID CRYSTAL PRISM ELEMENT
41: SUBSTRATE
42: SUBSTRATE
43: PRISM
44: PRISM ARRAY
45: LIQUID CRYSTAL LAYER
50: IMAGE DISPLAY PANEL
60: CONTROL SECTION
70: POSITION DETECTION SECTION
71: CAMERA
72: VIEWING POSITION CALCULATION SECTION

IMAGE DISPLAY APPARATUS

CROSS REFERENCE TO RELATED APPLICATION

The disclosure of International Application No. PCT/JP2014/001217 filed on Mar. 5, 2014, which claims priority to Japanese Patent Application No. 2013-065896 filed on Mar. 27, 2013, is incorporated herein by reference.

BACKGROUND

Field

The present disclosure relates to an image display apparatus such as a liquid crystal display.

Description of the Related Art

In recent years, image display apparatuses capable of displaying a stereoscopic image have been in widespread use. For example, Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, the optical refraction behavior by a deflection means is changed so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

Here, as an optical element which replaces the electrowetting cells in Japanese Laid-Open Patent Publication No. 2010-529485, a liquid crystal prism element is known which is formed such that a liquid crystal and a plurality of triangular prisms extending in a stripe manner are sealed between a pair of opposed substrates and which is able to change a deflection angle of emitted light in accordance with an applied voltage.

SUMMARY

The present disclosure provides an image display apparatus having excellent light converging characteristics.

An image display apparatus which attains the above-described object includes: a liquid crystal prism element including a prism array in which a plurality of prisms are arranged, a liquid crystal layer laminated on the prism array, and electrodes provided at position corresponding to the respective prisms which form the prism array; a control section configured to control a voltage to be applied to each electrode; and a position detection section configured to detect a viewing position of a user. The control section is able to apply the same or different voltages to the respective electrodes provided at the positions corresponding to the respective prisms, on the basis of a result of the detection of the viewing position by the position detection section.

According to the present disclosure, it is possible to realize an image display apparatus having excellent light converging characteristics.

BRIEF DESCRIPTION OF THE DRAWINGS

FIG. 1 is a schematic configuration diagram of an image display apparatus according to Embodiment 1;

FIG. 6 is a schematic configuration diagram of an image display apparatus according to Embodiment 2.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The applicant provides the following description and the accompanying drawings in order to allow a person of ordinary skill in the art to sufficiently understand the present disclosure, and the description and the drawings are not intended to restrict the subject matter of the scope of the patent claims.

<1. Embodiment 1>

Hereinafter, Embodiment 1 will be described with reference to FIGS. 1 to 5.

<1-1. Configuration of Image Display Apparatus>

Figure 2:
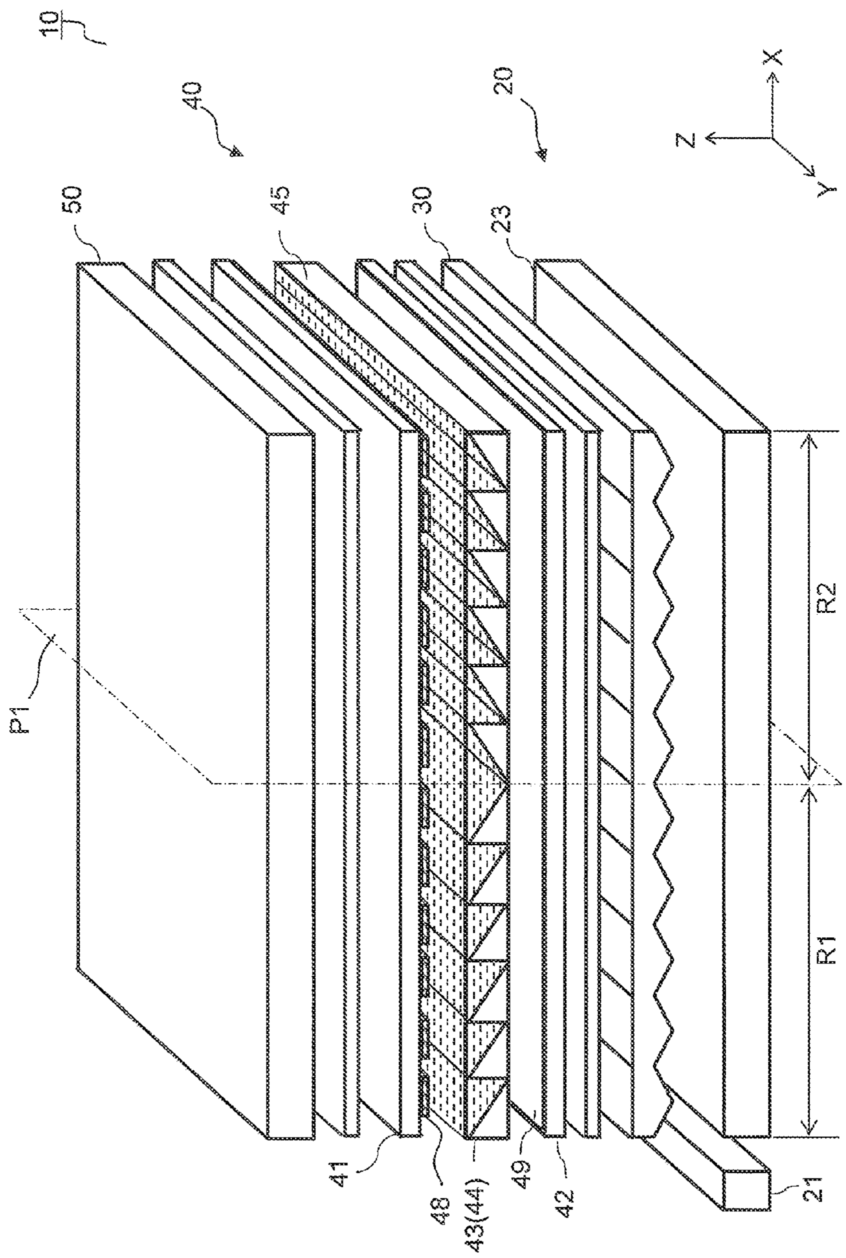
FIG. 2 is a schematic exploded perspective view of the image display apparatus according to Embodiment 1.

FIG. 1 is a schematic cross-sectional view of an image display apparatus 10 according to Embodiment 1. FIG. 2 is an exploded perspective view of the image display apparatus 10.

In the present embodiment, a three-dimensional orthogonal coordinate system is set for the image display apparatus 10, and a direction is specified by using the coordinate axes. As shown in FIGS. 1 and 2, an X axis direction coincides with a right-left direction (horizontal direction) when a user faces a display surface of an image display panel 50. A Y axis direction coincides with an up-down direction when the user faces the display surface of the image display panel 50. A Z axis direction coincides with a direction perpendicular to the display surface of the image display panel 50. Here, "facing" means that the user is located directly in front of the display surface such that, for example, when a letter of "A" is displayed on the display surface, the user sees the letter of "A" from a correct direction. In addition, FIGS. 1 and 2 correspond to views as seen from above the image display apparatus 10. Thus, the left side in FIGS. 1 and 2 corresponds to the right side of the display screen when the user sees the display screen.

The image display apparatus 10 includes a directional backlight 20, a liquid crystal prism element 40, the image display panel 50, a position detection section 70 which detects the position of a user who uses the image display apparatus 10, and a control section 60 which controls a liquid crystal driving voltage outputted to the liquid crystal prism element 40, on the basis of information of the detected position of the user. Here, the "directional backlight" refers to a backlight that has directivity in orientation characteristics and has narrow orientation characteristics as compared to orientation characteristics of a general backlight.

Hereinafter, each component will be described in detail.

<1-2. Configuration of Backlight>

The backlight 20 is a general edge incident type LED backlight. The backlight 20 includes a light source 21 arranged one-dimensionally along a side edge of a screen, a reflection film 22, a light guide plate 23, and a light control film 30. The reflection film 22 is provided on a lower surface side (back surface side) of the light guide plate 23, and the light control film 30 is provided on an upper surface side (front surface side) of the light guide plate 23.

The light source 21 is arranged along any of side surfaces of the light guide plate 23. In the present embodiment, the light source 21 is located at the left side surface of the light guide plate 23. The light source 21 has a plurality of LED elements arranged in the Y axis direction.

Light emitted from the light source 21 spreads within the light guide plate 23 while being repeatedly totally reflected at the upper surface and the lower surface of the light guide plate 23. Light having an angle exceeding the total reflection angle within the light guide plate 23 is emitted from the upper surface of the light guide plate 23. The lower surface of the light guide plate 23 is composed of a plurality of inclined surfaces 24 as shown in FIG. 1. By these inclined surfaces 24, light propagating within the light guide plate 23 is reflected in various directions, and thus the intensity of the light emitted from the light guide plate 23 becomes uniform across the entire upper surface.

The reflection film 22 is provided on the lower surface side of the light guide plate 23. Light having an angle exceeding the total reflection angles of the inclined surfaces 24 provided in the lower surface of the light guide plate 23 is reflected by the reflection film 22, enters the light guide plate 23 again, and is eventually emitted from the upper surface. The light emitted from the light guide plate 23 is incident on the light control film 30.

The light control film 30 includes a plurality of prisms 31 each having a triangular cross section and a ridge line extending in the Y axis direction. The plurality of prisms 31 are aligned in the X axis direction. That is, in the light control film 30, the prisms 31 each having a triangular cross section are arranged in a one-dimensional array. In addition, on an upper surface of the light control film 30, a plurality of cylindrical lenses extending in the Y axis direction may be aligned in the X axis direction. That is, a lenticular lens may be formed on the upper surface of the light control film 30.

The light incident on the lower surface of the light control film 30 is refracted toward the Z axis direction by the prisms 31, converged by the lenticular lens located on the upper surface, and is incident on the liquid crystal prism element 40.

<1-3. Configuration of Liquid Crystal Prism Element>

<1-3-1. Configuration>

Figure 3:
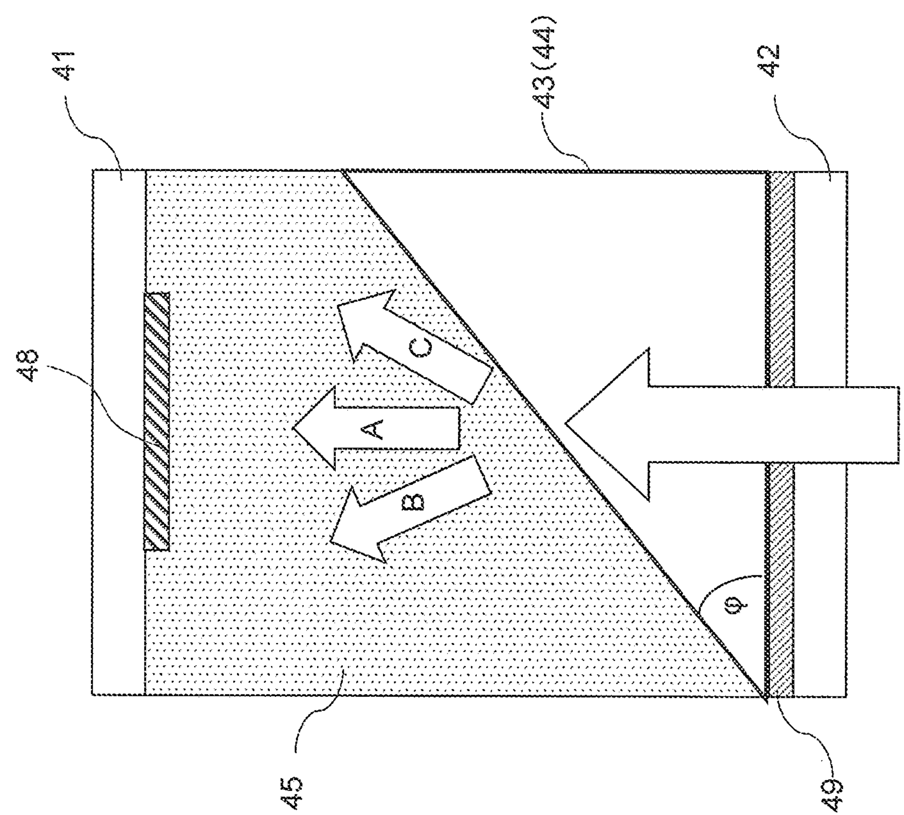
FIG. 3 is a partial cross-sectional view of a liquid crystal prism element 40 according to Embodiment 1.

FIG. 3 is a partially enlarged view of the liquid crystal prism element 40. Specifically, FIG. 3 is a partially enlarged view of a region R2 at the right side of the liquid crystal prism element 40 shown in FIG. 1. Hereinafter, the liquid crystal prism element 40 will be described in detail with reference to FIGS. 1 to 3.

As shown in FIGS. 1 and 2, the liquid crystal prism element 40 is arranged between the backlight 20 and the image display panel 50. The liquid crystal prism element 40 includes a substrate 41, a substrate 42, a prism array 44 composed of a plurality of prisms 43, a liquid crystal layer 45, a plurality of first electrodes 48, and a second electrode 49.

The substrate 41 and the substrate 42 are opposed to each other.

The prism array 44 is formed on an inner surface of the substrate 41 (a surface thereof facing the substrate 42). The prism array 44 is composed of the plurality of prisms 43 aligned in the X axis direction. Each of the prisms 43 has a substantially triangle-shaped cross section in an XZ plane. In the present embodiment, the cross section of each of the prisms 43 is a right triangle. As shown in FIG. 3, the prisms 43 are configured such that the oblique side of each prism 43 (the opposite side with respect to the right angle of the right triangle) is in contact with the liquid crystal layer 45 when being seen from the Y axis direction. In addition, as shown in FIG. 3, the oblique side of each prism 43 is inclined at an inclination angle $\phi$. As shown in FIG. 2, each of the prisms 43 is formed so as to extend in the Y axis direction. That is, each of the prisms 43 has a triangular pole shape.

The first electrodes 48 are formed between the substrate 41 and the liquid crystal prism element 40. In addition, the second electrode 49 is formed between the substrate 42 and the liquid crystal prism element 40.

As shown in FIG. 3, in the liquid crystal prism element 40, one first electrode 48 is arranged so as to correspond to one prism 48. That is, when a region corresponding to one prism 43 is defined as a unit structure of the liquid crystal prism element 40, the liquid crystal prism element 40 is formed by a plurality of the unit structures being arranged. The liquid crystal prism element 40 controls a deflection direction such that the light that is emitted from the light source 21 and incident thereon through the light guide plate 23 and the light control film 30 is converged at the position of the user. Specifically, as shown in FIG. 3, by controlling a voltage to be applied to the first electrodes 48 and the second electrode 49, the liquid crystal prism element 40 changes the orientations of the liquid crystal molecules within the liquid crystal layer 45. When the orientations of the liquid crystal molecules are changed, a refractive index distribution within the liquid crystal layer 45 changes. Due to a difference in refractive index caused between the prism 43 and the liquid crystal layer 45, the light is deflected. That is, by controlling the refractive index distribution within the liquid crystal layer 45, the light incident on the liquid crystal prism element 40 is transmitted through the prism 43 as it is (light A), is deflected toward a direction away from the inclined surface of the prism 43 (light B), or is deflected toward a direction close to the inclined surface of the prism 43 (light C).

As shown in FIG. 1, the plurality of prisms 43 are provided on the electrode 49 so as to be aligned in the X axis direction. Cross-sectional shapes of the plurality of prisms 43 are formed so as to be bilaterally symmetrical in the entire liquid crystal prism element 40. For facilitating the explanation, the liquid crystal prism element 40 is divided into left and right halves in FIG. 1, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 50 is indicated by P1. The cross-sectional shape of the prisms 43 located in the region R1 and the cross-sectional shape of the prisms 43 located in the region R2 are designed so as to be symmetrical to each other about the plane P1 when seen on a plane parallel to an XZ plane, as shown in FIGS. 1 and 2.

Hereinafter, the reason why the cross-sectional shapes are bilaterally symmetrical to each other will be described.

The liquid crystal prism element 40 has a property in which the efficiency of deflection toward a direction in which emitted light gets close to the inclined surface of each prism 43 (the light C in FIG. 3) is low as compared to that of deflection toward a direction in which emitted light becomes more distant from the inclined surface of each prism 43 (the light B in FIG. 3). Thus, when the inclined surfaces of the prisms 43 are made symmetrical about the plane P1 and are also made to face ahead of a central portion of the screen, the liquid crystal prism element 40 is able to efficiently deflect light incident near the left edge of the screen, toward ahead of the screen on the right, and is able to efficiently deflect light incident near the right edge of the screen, toward ahead of the screen on the left.

The liquid crystal layer 45 is formed between the substrate 41 and the substrate 42. Specifically, the liquid crystal layer 45 is in contact with the first electrodes 48 at the substrate 41 side and is in contact with the prism array 44 at the substrate 42 side.

Although each of the prisms 43 is formed so as to extend in a direction parallel to the Y axis direction in the present embodiment, each of the prisms 43 may be formed so as to extend in a direction inclined at a predetermined angle relative to the Y axis. When the direction in which each prism extends is inclined at the predetermined angle relative to the Y axis as described above, occurrence of moiré (interference fringes) is reduced. Moiré is a striped pattern that occurs visually due to a difference between the cycles of a plurality of periodic structures when the periodic structures are overlaid. In the image display apparatus 10 according to the present embodiment, since a plurality of periodic structures such as an arrangement of pixels of the image display panel 50, the light control film 30 (the prisms 31 and the cylindrical lenses), and the liquid crystal prism element 40 (the prism array 44) are overlaid, moiré is likely to occur. Thus, by forming each prism in a shape extending in a direction inclined at a predetermined angle relative to the Y axis, occurrence of moiré is reduced.

Although the first electrodes 48 and the second electrode 49 are formed between the substrate 41 and the prism array 44 and between the substrate 42 and the prism array 44, respectively, in the present embodiment, the first electrodes 48 and the second electrode 49 may be formed on surfaces of the substrates 41 and 42 that are opposite to the prism array 44, respectively. In addition, although the prism array 44 and the substrate 42 are configured as separate components in the present embodiment, the prism array 44 and the substrate 42 may be formed so as to be integrated with each other.

<1-3-2. Electrode>

Next, the electrode configuration will be described in detail.

Each first electrode 48 has an electrode structure of extending in the Y axis direction. The plurality of first electrodes 48 are arranged so as to be spaced apart from each other at predetermined intervals in the X axis direction. The number of the first electrodes 48 is substantially the same as the number of the prisms 43. One first electrode 48 is arranged with respect to one prism 43. By the plurality of first electrodes 48 being arranged, slit-like electrodes are configured.

In the image display apparatus 10 according to the present embodiment, different voltages can be applied to the first electrodes 48. Thus, the adjacent first electrodes 48 are not electrically conducted to each other and are arranged at a certain interval. In addition, the electrodes 48 are drawn to the vicinity of the screen edge such that different voltages can be applied to the respective electrodes 48, and are connected to external wires of a flexible printed circuit (FPC) or the like.

The second electrode 49 is a plane electrode which is not segmented. A uniform voltage is applied to the second electrode 49. It is noted that similarly to the first electrodes 48, the second electrode 49 may be configured with a plurality of slit-like electrodes such that different voltages can be applied to the plurality of electrodes. In this case, the electrode 48 may be a plane electrode which is not segmented. That is, at least one of two electrodes between which the liquid crystal layer 45 is interposed may have a slit-like electrode structure.

With such a configuration, in the respective regions of the liquid crystal prism element, it is possible to independently control voltages to be applied, and it is possible to independently control the orientation of the liquid crystal and a refractive index for transmitted light in each region.

As the materials of the substrates 41 and 42 and the prisms 43, glass or resin can be used. When resin is used as the material of the prisms 43, the prisms 43 can be formed by, as an example, imprinting a UV-curing resin on a glass substrate. The liquid crystal prism element 40 can be produced by forming a one-dimensional array of the prisms 43 on the substrate 42 on which the electrode 49 has been formed, then attaching together the substrate 42 and the substrate 41 on which the electrodes 48 have been formed, and sealing a liquid crystal between the substrates 41 and 42 that are opposed to each other.

<1-3-3. Liquid Crystal>

The liquid crystal prism element 40 is an element that is able to control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 45 has a birefringence property in which a refractive index is different for each polarization direction of incident light. In addition, when the direction of the longitudinal axis orientation (director) of each liquid crystal molecule relatively changes with respect to the polarization direction of light, the refractive index of the liquid crystal layer 45 also changes. Thus, when the orientation of the liquid crystal is changed by an electric field generated by applying a certain voltage, the refractive index for transmitted light changes, and hence a deflection angle which is a refraction angle of the light changes.

In the present embodiment, the case where uniaxial positive type liquid crystal is used as the material forming the liquid crystal layer 45 will be considered. Then, the case where the longitudinal axes of the liquid crystal molecules are oriented in the Y axis direction when no voltage is applied between the first electrodes 48 and the second electrode 49; and the longitudinal axes of the liquid crystal molecules are oriented in the Z axis direction when a voltage is applied between the first electrodes 48 and the second electrode 49 will be considered. It is noted that the liquid crystal molecules may be negative type liquid crystal. In addition, in the present embodiment, in a state where no voltage is applied to the liquid crystal prism element 40, the orientations of the liquid crystal molecules may be inclined at a predetermined angle relative to the electrodes 48.

In general, in the case where light is deflected by an active element such as the liquid crystal prism element 40, it is desirable to use a liquid crystal material having high Δn (=refractive index $n_e$ for extraordinary light—refractive index $n_0$ for ordinary light), in order to increase a deflection angle. However, among commercially available materials, the number of liquid crystal materials having high Δn is small, and Δn is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, power consumption, and a switching speed.

<1-4. Configuration of Image Display Panel>

Light transmitted through the liquid crystal prism element 40 is incident on the image display panel 50. The image display panel 50 displays an image or video. The image display panel 50 is composed of, for example, a liquid crystal panel. One example of the image display panel 50 is an in-plane-switching type panel. However, another type of image display panel can be used as the image display panel 50. Light transmitted through the image display panel 50 has directivity and is converged at the position of an eye of the observer.

<1-5. Configuration of Position Detection Section>

The position detection section 70 includes a camera 71 and a viewing position calculation section 72. The camera 71 takes an image of the user in predetermined cycles. The viewing position calculation section 72 analyzes the image taken by the camera 71 and calculates viewing position information representing a viewing position of the user. For image analysis performed by the camera 71, a known algorithm for recognizing the position of a face or a portion (eyes, nose, etc.) of a face can be used. In addition, the viewing position information calculated by the viewing position calculation section 72 preferably represents the positions of the eyes of the user, but may represent the position of the face, the nose, or the like instead of the positions of the eyes.

<1-6. Configuration of Control Section>

The control section 60 controls the value of a voltage to be applied to the liquid crystal prism element 40, on the basis of the viewing position information calculated by the viewing position calculation section 72. More specifically, when the viewing position of the user shifts from a position in front of the screen center to the screen left edge side as shown in FIG. 1, the refractive index of the liquid crystal layer 45 is made lower than the refractive index of each prism 43 in the region R1, and the refractive index of the liquid crystal layer 45 is made higher than the refractive index of each prism 43 in the region R2. Thus, the light emitted from each prism 43 is deflected in the rightward direction as seen from the user. At that time, a voltage to be applied to the liquid crystal layer 45 in the region R1 is made higher than a voltage to be applied when light is not deflected, and a voltage to be applied to the liquid crystal layer 45 in the region R2 is made lower than the voltage to be applied when light is not deflected.

In contrast, when the viewing position of the user shifts from a position in front of the screen center to the right edge side, the refractive index of the liquid crystal layer 45 is made higher than the refractive index of each prism 43 in the region R1, and the refractive index of the liquid crystal layer 45 is made lower than the refractive index of each prism 43 in the region R2. Thus, the light emitted from each prism 43 is deflected in the leftward direction as seen from the user. At that time, the voltage to be applied to the liquid crystal layer 45 in the region R1 is made lower than the voltage to be applied when light is not deflected, and the voltage to be applied to the liquid crystal layer 45 in the region R2 is made higher than the voltage to be applied when light is not deflected.

The voltage to be applied to the liquid crystal prisms in the region R1 depends on an angle at which desired transmitted light is deflected. Basically, the liquid crystal prism element 40 is an element which utilizes a refraction phenomenon which occurs due to a difference in refractive index between the prisms 43 and the liquid crystal layer 45. Thus, a deflection angle θ can be calculated by using the following formula (1) when the inclination angle of the prism 43 is denoted by ϕ, the refractive index of the liquid crystal layer 45 is denoted by ne, and the refractive index of the prism 43 is denoted by np.

$$np \times \sin\phi = n_e \times \sin(\phi+\theta) \quad (1)$$

However, for example, in the process of manufacturing a liquid crystal prism element, the inclination angles of some prisms of the plurality of prisms may deviate from a design value. In this case, when a uniform voltage is applied to the entirety of the liquid crystal prism element, the deflection angle of light deviates in the region of the prisms that deviate from the design. In addition, the case is also considered in which in the manufacturing process, the inclination angles of all the prisms deviate from the design value due to wear of a mold for forming prisms, a molding error, or the like. In addition, the case is also considered in which characteristics of each lot of the liquid crystal material vary. In such as case, even when a predetermined voltage is applied, the deflection angle of light deviates from a design value, so that the directivity of the backlight is impaired.

Thus, in the present embodiment, the liquid crystal prism element 40 is configured such that a voltage to be applied can be controlled for each unit structure of the liquid crystal prism element 40. Thus, for example, even when a manufacturing error occurs in the shape of the prism or the characteristics of the liquid crystal material vary, since a voltage to be applied can be controlled for each unit structure, it is possible to suppress deterioration of the light converging characteristics of the liquid crystal prism element 40.

Therefore, the liquid crystal prism element 40 according to the present embodiment is able to deflect a light beam in accordance with the position of the user while maintaining desired directivity. For example, when the inclination angle ϕ of the prism is lower than the design value, merely a low deflection angle is obtained with the same voltage value. Thus, the voltage value is changed such that a greater difference in refractive index is obtained. The voltage value to be changed is different depending on the deflection angle of the prism. For example, correction is enabled in which: in the case of deflection toward the inclined surface of the prism, the voltage to be applied is made lower than the design value; and in the case of deflection toward a direction opposite to the inclined surface, the voltage to be applied is made higher than the design value. The magnitude of the voltage to be applied is set as appropriate in accordance with the characteristics of the material used for the liquid crystal layer.

<1-7. Method of Adjusting Voltage to be Applied>

Figure 4:
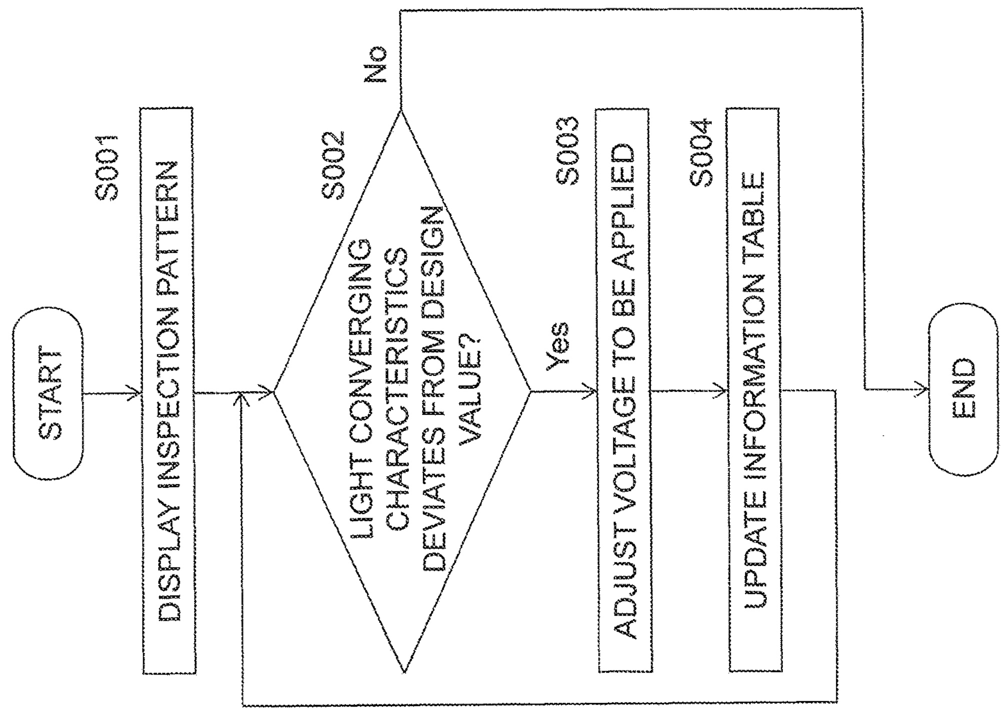
FIG. 4 is a flowchart showing an example of an applied voltage adjusting method.

FIG. 4 is a flowchart showing an example of a method of adjusting a voltage to be applied.

First, in step S001, a predetermined inspection pattern is displayed on the image display apparatus 10. The inspection pattern displayed in this case is not particularly limited as long directivity at each viewing position can be identified. Thereafter, the process proceeds to step S002.

Next, in step S002, light converging characteristics at each viewing position are evaluated, and it is determined whether the light converging characteristics deviate from a design value. The viewing position corresponds to the position of the glabella of the user. The light converging characteristics at each viewing position can be evaluated, for example, by detecting the intensity of light converged at a light converging position by use of an inspection device including a camera, and by comparing the detected intensity to the design value. This evaluation may be repeatedly performed while the relative position of the inspection device relative to the image display apparatus 10 is changed. Alternatively, instead of using the inspection device, the user may evaluate the visibility through visual observation. In step S002, if it is determined that the light converging characteristics deviate from the design value (Yes in step S002), the process proceeds to step S003, and if the result of the determination is No, the applied voltage adjustment is ended.

Next, in step S003, the value of the voltage to be applied to each first electrode 48 is adjusted. The adjustment of the voltage value can be performed by increasing or decreasing the voltage to be applied to each first electrode 48, by a predetermined voltage value. The deflection angle of light emitted from a lateral portion of the screen is larger than the deflection angle of light emitted from a central portion of the screen. Therefore, the adjustment range of the voltage value may be changed in accordance with the positions of the first electrodes 48 such that the difference between the voltage to be applied to the first electrodes 48 located at the center of the screen and the voltage to be applied to the first electrodes 48 located at a lateral side with respect to the center of the screen is increased from the center of the screen toward the lateral side of the screen. Thereafter, the process proceeds to step S004.

Next, in step S004, an information table is updated in which the viewing position and the voltage to be applied to each first electrode 48 after the adjustment are associated with each other. The information table is stored in a storage device such as a memory which is included in the image display apparatus 10, and is referred to when the control section 60 controls the voltage to be applied, on the basis of the viewing position of the user. In addition, in the information table, the design value for the voltages to be applied to the first electrodes 48 is set as an initial value. Thereafter, the process proceeds to step S002, and the evaluation of the light converging characteristics at each viewing position is performed again.

Since the image display apparatus 10 according to the present disclosure has a configuration of being able to individually control the voltages to be applied to the plurality of first electrodes 48, the voltage to be applied to each first electrode 48 can be optimized by the adjustment method described above, thereby correcting deviation of the light converging characteristics which is caused due to a manufacturing error or the like. Therefore, the image display apparatus 10 according to the present disclosure can exhibit excellent light converging characteristics as designed.

It is noted that the above-described applied voltage adjustment may be performed before factory shipment, or the user may perform the above-described applied voltage adjustment before using the image display apparatus 10. In addition, the voltage to be applied may be previously adjusted as designed before factory shipment, and the user may be allowed to then perform adjustment such that light converging characteristics with which visibility is good are obtained. An adjustment menu may be provided to settings of the image display apparatus 10 or the like such that the user is allowed to adjust the voltage to be applied to each first electrode 48 (i.e., the light converging characteristics at each viewing position). With such a configuration in which the user is allowed to adjust the light converging characteristics after factory shipment as described above, even when the interval between the eyes or a viewing distance of each user varies among different individuals, it is possible to achieve light converging characteristics which are most appropriate for each user.

Figure 5:
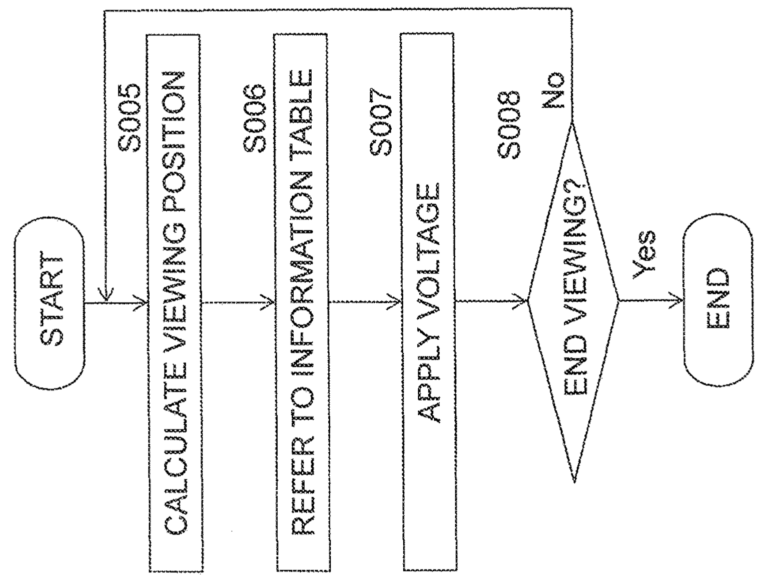
FIG. 5 is a flowchart showing an applied voltage control process performed during viewing.

FIG. 5 is a flowchart showing an example of an applied voltage control process performed during viewing.

First, in step S005, the position detection section 70 detects the viewing position of the user. Thereafter, the process proceeds to step S006.

Next, in step S006, the control section 60 refers to the information table and acquires the value of the voltage to be applied to each first electrode 48 which is associated with the viewing position. Thereafter, the process proceeds to step S007.

Next, in step S007, the control section 60 controls the voltage to be applied to each first electrode 48, on the basis of the applied voltage value acquired from the information table. Thereafter, the process proceeds to step S008.

Next, in step S008, the control section 60 determines whether an instruction to end screen display has been made. The instruction to end the screen display can be determined, for example, by whether the user has performed an operation of turning off the power. If the screen display is ended (Yes in step S008), the applied voltage control process is ended, and if the result of the determination is No, the control section 60 returns to step S005 and repeats the above process.

As described above, by referring to the detected viewing position of the user and the previously prepared information table, light can be appropriately converged at the viewing position of the user, regardless of the viewing position of the user.

<1-8. Advantageous Effects, Etc.>

As described above, the image display apparatus 10 according to the present embodiment includes the liquid crystal prism element 40, the position detection section 70, and the control section 60.

The liquid crystal prism element 40 includes the prism array 44 in which the plurality of prisms 43 are arranged, the liquid crystal layer 45 laminated on the prism array 44, the first electrodes 48 provided at positions corresponding to the respective prisms 43 which form the prism array 44, and the second electrode 49.

The control section 60 controls the voltage to be applied to each electrode.

The position detection section 70 detects the viewing position of the user. The control section 60 is able to apply the same or different voltages to the respective first electrodes 48 corresponding to the prisms 48, on the basis of a result of the detection of the position detection section 70.

With such a configuration, the refractive index of the liquid crystal layer 45 and the deflection angle of emitted light can be individually controlled for each unit structure of the liquid crystal prism element 40. As a result, it is possible to achieve optimum display characteristics of the image display apparatus 10.

In addition, even when a manufacturing error occurs in the liquid crystal prism element 40, it is possible to easily compensate for the error by individually adjusting the voltage to be applied to each first electrode 48. As a result, it is possible to achieve excellent display characteristics close to the design value.

Describing the configuration of the liquid crystal prism element 40 in detail, the liquid crystal prism element 40 includes the plurality of first electrodes 48 and the second electrode 49 opposed to the plurality of first electrodes 48 with the prism array 44 and the liquid crystal layer 45 interposed therebetween. The plurality of first electrodes 48 are arranged so as to correspond to the plurality of prisms 43, respectively.

It is possible to achieve the above-described advantageous effects also in such a specific configuration.

<2. Embodiment 2>

Hereinafter, Embodiment 2 will be described. An image display apparatus 100 according to Embodiment 2 is different from the image display apparatus 10 according to Embodiment 1 in that the backlight includes two light sources and the image display apparatus 100 supports a time division method in which an image for right eye and an image for left eye are displayed while alternately switching between the image for right eye and the image for left eye. Hereinafter, portions having different configurations will be described, and the description of the same configurations may be omitted.

<2-1. Configuration of Image Display Apparatus>

Figure 7:
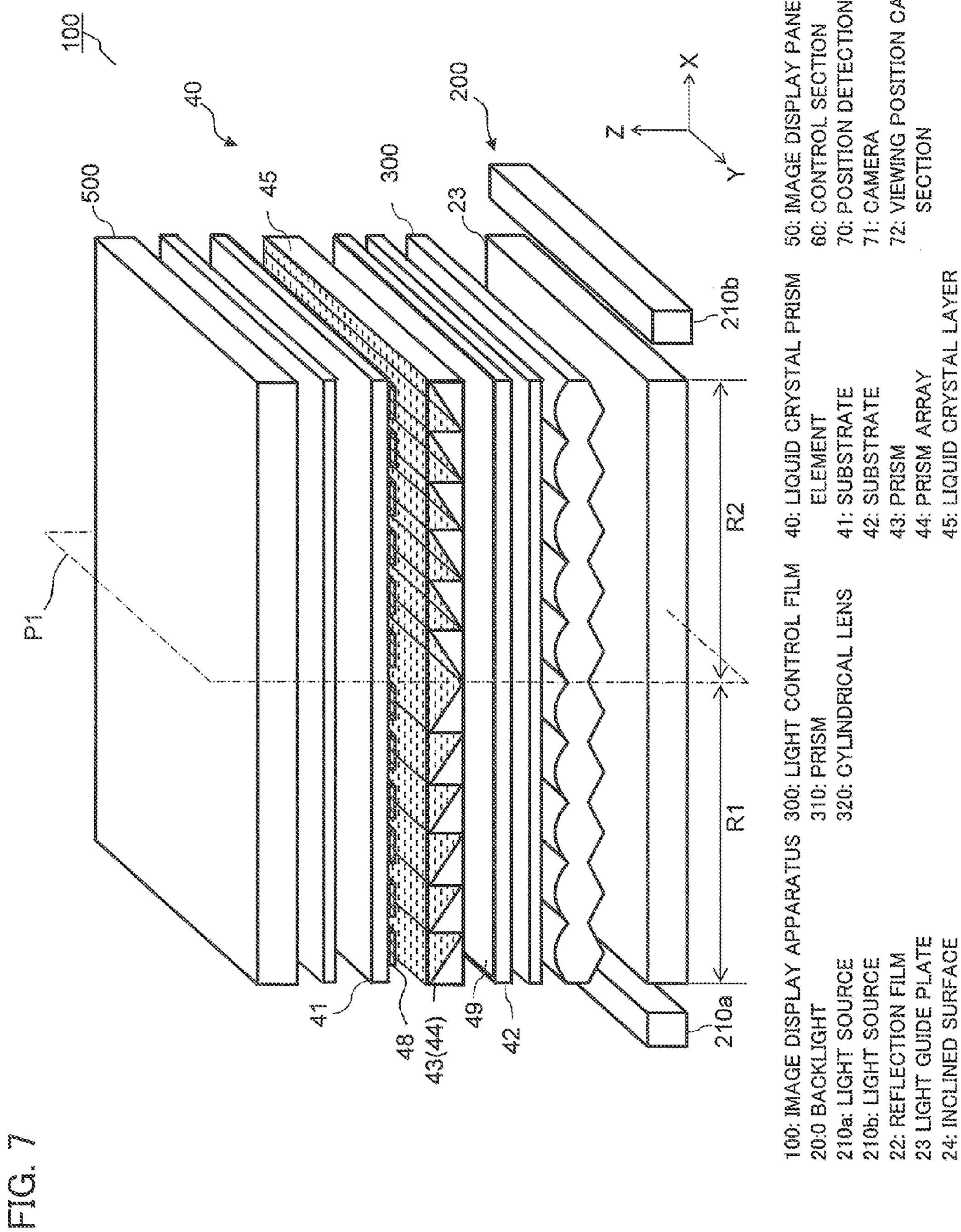
FIG. 7 is a schematic exploded perspective view of the image display apparatus according to Embodiment 2.

FIG. 6 is a schematic diagram of the image display apparatus 100 according to Embodiment 2. FIG. 7 is an exploded perspective view of the image display apparatus 100.

The image display apparatus 100 includes a light source switching type backlight 200, a liquid crystal prism element 40, an image display panel 500 which displays an image for right eye and an image for left eye while alternately switching between the image for right eye and the image for left eye, a position detection section 70 which detects the position of a user who uses the image display apparatus 100, and a control section 60 which controls a liquid crystal drive voltage to be outputted to the liquid crystal prism element 40, on the basis of detected position information of the user.

The image display apparatus 100 switches ON/OFF of light sources 210*a* and 210*b* in synchronization with switching between the image for right eye and the image for left eye. In addition, when the switching between the image for right eye and the image for left eye is performed at a frequency equal to or higher than 120 Hz, the user can recognize a natural stereoscopic image on the basis of the image for right eye and the image for left eye.

Hereinafter, each component will be described in detail.

<2-2. Configuration of Backlight>

The backlight 200 includes the light sources 210*a* and 210*b* opposed to each other, a reflection film 22, a light guide plate 23, and a light control film 300. The light sources 210*a* and 210*b* are arranged along a pair of side surfaces of the light guide plate 23 and opposed to each other in the X axis direction. The light source 210*a* is located at the left side surface of the light guide plate 23, and the light source 210*b* is located at the right side surface of the light guide plate 23. For example, each of the light sources 210*a* and 210*b* has a plurality of LED elements arranged in the Y axis direction. Each of the light sources 210*a* and 210*b* alternately repeats lighting-up and going-out in synchronization with switching between the image for right eye and the eye image for left eye which are displayed on the image display panel 500. That is, when the image display panel 500 displays the image for right eye, the light source 210*a* lights up and the light source 210*b* goes out, and when the image display panel 500 displays the image for left eye, the light source 210*a* goes out and the light source 210*b* lights up.

Light emitted from the light sources 210*a* and 210*b* spreads within the light guide plate 23 while being repeatedly totally reflected at the upper and lower surface of the light guide plate 23. Light having an angle exceeding the total reflection angle within the light guide plate 23 is emitted from the upper surface of the light guide plate 23.

The light control film 300 includes prisms 310 and cylindrical lenses 320. On a lower surface of the light control film 300, a plurality of the prisms 310 each having a triangular cross section and a ridge line extending in the Y axis direction are aligned in the X axis direction. That is, on the lower surface of the light control film 300, the prisms 31 each having a triangular cross section are arranged in a one-dimensional array. In addition, on an upper surface of the light control film 300, a plurality of the cylindrical lenses 320 extending in the Y axis direction are aligned in the X axis direction. That is, a lenticular lens is formed on the upper surface of the light control film 300.

The light incident on the lower surface of the light control film 300 is refracted toward the Z axis direction by the prisms 310, converged by the lenticular lens located on the upper surface, and is incident on the liquid crystal prism element 40.

The liquid crystal prism element 40 has the same configuration and function as those in Embodiment 1.

<2-3. Advantageous Effects, Etc.>

Similarly to the image display apparatus according to Embodiment 1, the image display apparatus 100 according to the present embodiment can exhibit excellent light converging characteristics even when a manufacturing error is present or material characteristics vary.

<3. Other Modifications>

Instead of the light control films 30 and 300 which are described in Embodiments 1 and 2 and in which the prisms and the lenticular lens are integrated, a prism sheet and a lenticular lens sheet may be individually provided.

Moreover, in Embodiments 1 and 2, the directions of the inclined surfaces of the prisms 43 in the liquid crystal prism element 40 are made different between the regions R1 and R2, and the inclined surfaces of the prisms 43 are formed so as to be symmetrical about the plane P1. However, the directions of the inclined surfaces of the prisms may be uniform in the entire liquid crystal prism element 40.

Furthermore, Embodiments 1 and 2 have been described with, as an example, a stereoscopic image display apparatus that displays, simultaneously or in a time division manner, an image for right eye and an image for left eye that have a parallax. However, an image having no parallax may be displayed. In this case, the light sources 21*a* and 21*b* are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the viewer and projecting an image only on the eyes of the viewer and the vicinity thereof in a reduced range.

Furthermore, in Embodiment 2, the backlight 200 is not limited to have the configuration shown in FIGS. 6 and 7, and may have another configuration as long as it is able to alternately emit light for right eye and light for left eye in a time division manner in synchronization with switching between right and left image signals.

Furthermore, in Embodiment 2, the light guide plate is shared by the light sources 210*a* and 210*b*. However, a light guide plate for the light source 210*a* and a light guide plate for the light source 210*b* may be provided so as to be laminated on each other.

The present disclosure is applicable to an image display apparatus displaying a stereoscopic image, and the like. Specifically, the present disclosure is applicable to display surfaces of a television, a personal computer, and a digital still camera, a display surface of a video camera, a display surface of a camera-equipped cellular phone, a display surface of a smart phone, a display surface of a tablet computer, and the like.

As presented above, the embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. An image display apparatus comprising:

a liquid crystal prism element including a prism array in which a plurality of prisms are arranged, a liquid crystal layer laminated on the prism array, and electrodes provided at position corresponding to the respective prisms which form the prism array;

a control section configured to control a voltage to be applied to each electrode; and a position detection section configured to detect a viewing position of a user, wherein the control section is able to apply the same or different voltages to the respective electrodes provided at the positions corresponding to the respective prisms, on the basis of a result of the detection of the viewing position by the position detection section, the control section increases a difference between a voltage to be applied to the electrode located at a central portion including the center, in a lateral direction, of the liquid crystal prism element and a voltage to be applied to the electrode located at a lateral side with respect to the central portion, as a distance from the electrode located at the central portion of the liquid crystal prism element to the electrode located at the lateral side of the liquid crystal prism element increases.

2. The image display apparatus according to claim 1, wherein the electrodes include:

a plurality of first electrodes; and a second electrode opposed to the plurality of first electrodes with the prism array and the liquid crystal layer interposed therebetween, and the plurality of first electrodes are arranged so as to correspond to the plurality of prisms, respectively.

3. The image display apparatus according to claim 1, wherein cross sections of the plurality of prisms are right triangles, inclined surfaces of the plurality of prisms are comparable to a hypotenuse of the right triangles; and inclined surfaces are formed such that a direction of the inclined surfaces are different with respect to a center of the liquid crystal prism element, and are arranged symmetrical about the center.

* * * * *